US006850683B2

(12) United States Patent
Lee et al.

(10) Patent No.: US 6,850,683 B2
(45) Date of Patent: Feb. 1, 2005

(54) LOW-LOSS WAVEGUIDE AND METHOD OF MAKING SAME

(75) Inventors: Kevin K. Lee, Cambridge, MA (US); Desmond R. Lim, Cambridge, MA (US); Kazumi Wada, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/876,392

(22) Filed: Jun. 7, 2001

(65) Prior Publication Data

US 2002/0031321 A1 Mar. 14, 2002

Related U.S. Application Data

(60) Provisional application No. 60/234,845, filed on Sep. 22, 2000, and provisional application No. 60/217,167, filed on Jul. 10, 2000.

(51) Int. Cl.$^7$ .................................................. G02B 6/10
(52) U.S. Cl. ....................... 385/129; 385/130; 385/131; 385/132; 65/386; 216/24
(58) Field of Search ............................... 385/129–132; 65/386; 216/24; 316/24

(56) References Cited

U.S. PATENT DOCUMENTS

| | | | | |
|---|---|---|---|---|
| 5,143,577 A | * | 9/1992 | Haas et al. .................... | 216/24 |
| 5,163,118 A | | 11/1992 | Lorenzo et al. | |
| 5,360,982 A | | 11/1994 | Venhuizen .................... | 385/14 |
| 5,494,834 A | | 2/1996 | Venhuizen ...................... | 437/2 |
| 5,908,305 A | * | 6/1999 | Crampton et al. ........... | 438/141 |
| 6,253,015 B1 | * | 6/2001 | Ukrainczyk ................. | 385/130 |
| 6,684,019 B1 | * | 1/2004 | Norwood et al. ........... | 385/129 |
| 2002/0104822 A1 | * | 8/2002 | Naydenkov et al. .......... | 216/24 |
| 2003/0026571 A1 | * | 2/2003 | Bazylenko .................. | 385/129 |
| 2003/0207215 A1 | * | 11/2003 | Xu et al. ..................... | 430/321 |

FOREIGN PATENT DOCUMENTS

| | | |
|---|---|---|
| EP | 0 331 335 | 2/1989 |
| JP | 04271328 A * | 9/1992 ............. G02F/1/35 |

OTHER PUBLICATIONS

Rickman et al.; Dec. 1994; IEE Proc.–Optoelectron; vol. 141, No. 6; p. 391.*
Lacey et al.; Aug. 1990; IEE Proceedings, vol. 137, No. 4, p. 282.*
Fischer et al.; May 1996; IEEE Photonics Technol. Letter; vol. 8, No. 5; p. 647.*
"Integrated Optics in Si and SiGe–Heterostructures," Schuppert et al. Sep. 27, 1992. *Yechnische Universitat Berlin, Institut fur Hochfrequenztechnik*. We B10.1.
"Silicon Raised Strip Waveguides Based on Silicon and Silicon Dioxide Thermal Bonding, " Zhao et al. Apr. 1997. *IEEE Photonics Technology Letters*, vol. 9, No. 4.
"Reflow and Burial of Channel Waveguides Formed in Sol–Gel on Si Substrates," Syms et al. Sep. 1993. *IEEE Photonics Technology Letters*, vol. 5, No. 9.
"Smoothing of Si Trench Sidewall Surface by Chemical Dry Etching and Sacrificial Oxidation", Yahata et al., Jpn. J. Appl. Phys. vol. 37, pp. 3954–3955, Part 1., No. 7, Jul. 1998.
"Controlling Sidewall Smoothness For Micromachined Si Mirrors and Lenses", Juan et al., J. Vac. Sci. Technol., 1996 American Vacuum Society, pp. 4080–4084.

* cited by examiner

*Primary Examiner*—Akm Enayet Ullah
*Assistant Examiner*—Daniel Petkovsek
(74) *Attorney, Agent, or Firm*—Gauthier & Connors LLP

(57) ABSTRACT

A method of reducing the scattering losses that involves smoothing of the core/cladding interface and/or change of waveguide geometry in high refractive index difference waveguides. As an example, the SOI-based $Si/SiO_2$ waveguides are subjected to an oxidation reaction at high temperatures, after the waveguide patterning process. By oxidizing the rough silicon core surfaces after the patterning process, the core/cladding interfaces are smoothened, reducing the roughness scattering in waveguides.

43 Claims, 2 Drawing Sheets

Light travels in the Si Core

LOW-LOSS WAVEGUIDE AND METHOD OF MAKING SAME

This application claims priority from provisional application Ser. No. 60/217,167 filed Jul.10, 2000, and claims the benefits of 60/217,167 filed Jul. 10, 2000.

This invention was made with government support under Grant No. DMR-9808941 awarded by the National Science Foundation. The government has certain rights in the invention.

BACKGROUND OF TH INVENTION

The invention relates to the field of optical waveguides, and the method of manufacturing waveguides.

Roughness scattering is one of the major sources of transmission loss in planar waveguides. The roughness at the core/cladding interface, arising from the waveguide patterning process, is responsible for such a scattering. Several methods are possible to reduce the scattering losses in planar waveguides. Reduction of scattering loss by annealing the waveguide at high temperature, after the waveguide patterning process, has been previously reported by Kashimura et al. in Japanese Journal of Applied Physics, Vol. 39, Jun.2000. This publication reports the loss reduction technique for a waveguide with a low index difference waveguide between the core and the cladding. $GeO_2$-doped silica (silicon dioxide) waveguides, whose refractive index difference between the core and the cladding is ~0.02, were used in that study.

The roughness scattering is particularly severe for high index difference waveguides where the effective refractive index difference between the core and the cladding is above 0.1. The effective refractive index difference higher than 0.1 corresponds to the waveguide single-mode cutoff dimension less than roughly 2.5 times the wavelength in the core. Yet there has been no prior art on reducing the scattering losses by subjecting high index difference waveguides to a smoothing process after the waveguide patterning.

A strip $Si/SiO_2$ waveguide based on SOI is an example of a high index difference waveguide. A strip waveguide has a core surrounded by a cladding comprising one or more materials having different refractive indices than the core. For SOI waveguides, oxidation at an elevated temperature is one method that smoothens rough interface and thus reduces the scattering loss. Smoothing of rough surfaces of silicon after the patterning process by oxidation, followed by oxide removal, has been reported in the literature. Juan et al., Journal of Vacuum Science Technology B, Vol. 14, No. 6, Nov./Dec. 1996, report oxidation smoothing of silicon sidewalls for mirror applications while Yahata et al., Japanese Journal of Applied Physics, Vol. 37, Jul. 1998, report smoothing for MOS applications. Yet, there have been no publications on oxidation smoothing of the silicon waveguide core to reduce scattering losses in strip waveguides.

U.S. Pat. No. 5,360,982, issued to Venhuizen describes a new waveguide fabrication technology that produces smooth silicon waveguide surface. Waveguides with smooth interfaces are formed by local oxidation of the silicon substrate. This process is different from our present invention in that the waveguide is formed by oxidation in the patent, while in the invention, the oxidation step is incorporated after the waveguides are already formed by patterning.

SUMMARY OF THE INVENTION

The invention provides a technique of making low-loss waveguides by subjecting the waveguide, after the waveguide patterning process, to treatments that smoothen the core/cladding interfaces, and/or change the waveguide core dimension. The invention is particularly useful for high index difference waveguide systems where the scattering loss is high. In an exemplary embodiment, a method includes smoothing of the core/cladding interface of SOI-based $Si/SiO_2$ waveguides by oxidation at high temperatures, after the waveguide patterning process.

The invention provides a new waveguide fabrication method that involves a waveguide patterning process, followed by smoothing of the waveguide core surface. The invention provides a method of reducing the scattering losses in planar waveguide by subjecting the already-fabricated waveguide to treatments that reduce the dimension of the waveguide core, reducing the effective core refractive index, effective refractive index difference, and the scattering losses, since the scattering loss is a strong function of effective refractive index difference between the core and the cladding.

The invention shows that the rough silicon core surfaces of $Si/SiO_2$ waveguides, resulting from waveguide patterning processes (e. g. photo-lithography and etching), are smoothened by oxidation at high temperatures. Various oxidants can be used to react with the silicon core to form $SiO_2$ on the surfaces at elevated temperatures in $Si/SiO_2$ waveguides.

The aforementioned smoothing of the waveguide core can be achieved in a diffusive process that tends to minimize the energy of the rough surface by annealing the core material, after the waveguide patterning, at elevated temperatures above 100° C. in a gaseous ambient other than air or vacuum.

DETAILED DESCRIPTION OF THE INVENTION

Figure 1:
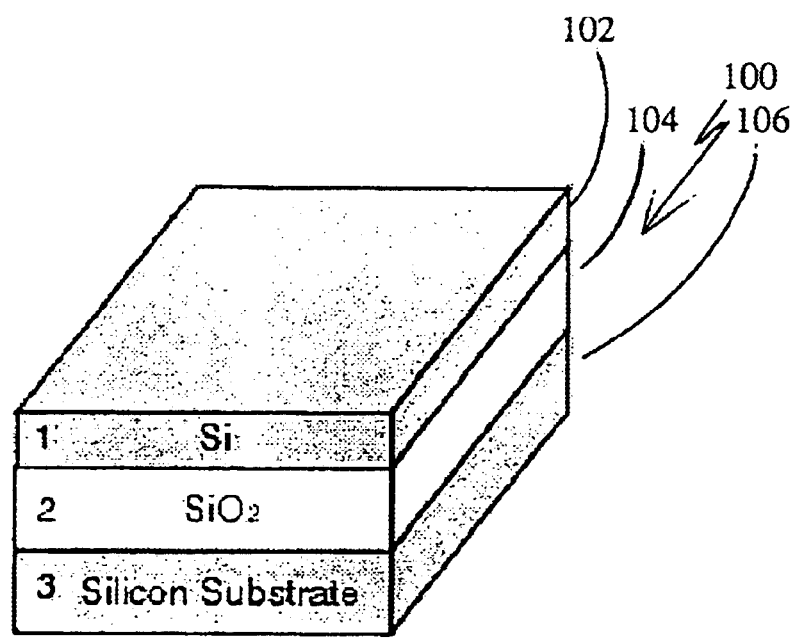
FIG. 1 is a perspective block diagram of an initial SOI platform 100 on which a waveguide is formed.

An exemplary embodiment of the invention provides an oxidation smoothing technique that reduces the roughness at the core/cladding interfaces of $Si/SiO_2$ waveguide. FIG. 1 is a perspective block diagram of an initial SOI platform 100 on which a waveguide is formed. A top silicon layer 102 will be made into a waveguide core while a $SiO_2$ layer 104 will become an undercladding layer. A silicon substrate 106 is provided for mechanical support.

Figure 2:
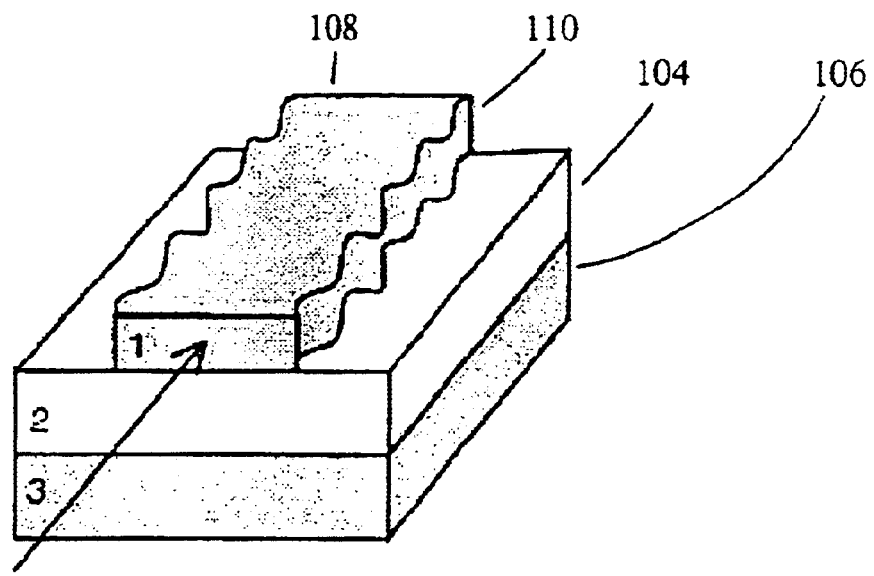
FIG. 2 is a perspective block diagram of the platform of FIG. 1 including a waveguide core 108 after a typical patterning process.
Figure 3:
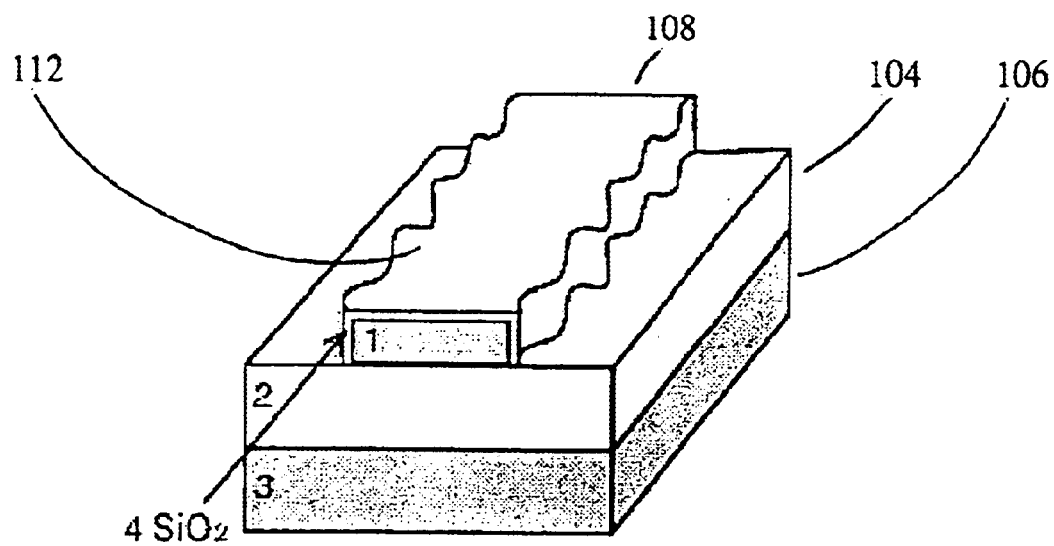
FIG. 3 is a perspective block diagram of the platform of FIG. 2 after the surfaces of the core have reacted with the oxidizing agents and form a coating layer of $SiO_2$.

FIG. 2 is a perspective block diagram of the platform including a waveguide core 108 after a typical patterning process including photolithography and etching of the layer 102. The sidewall roughness 110 of the core 108 is due to the waveguide patterning process. This roughness is responsible for scattering loss in the waveguide. The core 108 is then subjected to oxidizing agents, such as $O_2$ or $H_2O$ gases at an elevated temperature. The surfaces of the core will react with the oxidizing agents and form a coating layer of $SiO_2$ 112, as shown in FIG. 3. Since convex points of the rough surface 110 oxidize faster than concave points, the reaction tends to reduce the roughness of the core.

The reaction rate increases with the reaction temperature. When the reaction temperature is too low, the reaction rate is too slow for enough oxidation. When the reaction temperature is too high, one may not have a good control over the thickness of $SiO_2$ formed because of a high reaction rate. In order to grow nm to μm of $SiO_2$ in a period of minutes to hours, typical temperature ranges between 600 to 1200° C.

The oxidation time should be chosen carefully to form desired $SiO_2$ thickness and to achieve desired waveguide core dimension. The choice of time will depend on the oxidation temperature since the reaction rate depends on the temperature.

Figure 4:
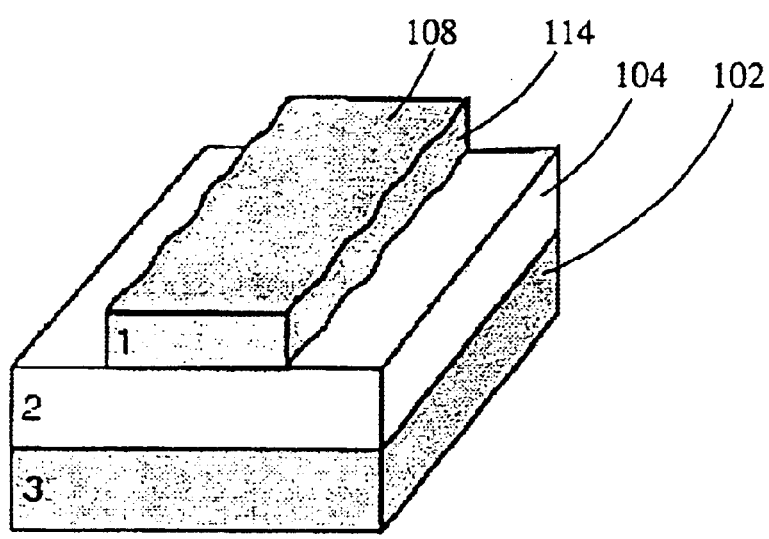
FIG. 4 is a perspective block diagram of the platform of FIG. 3 following the removal of the $SiO_2$ layer to show the silicon core surface after smoothing.

FIG. 4 is a perspective block diagram of the platform following the removal of the $SiO_2$ layer 112 to show the silicon core surface 114 after smoothing. Alternatively, one can choose not to remove the $SiO_2$ layer 112 since it can act as a cladding layer for the waveguide core in FIG. 3.

The method of the invention can be used to smoothen the waveguide core surfaces of other geometries, such as ridge waveguides. Any SOI waveguide whose core is defined by a patterning process that produces surface roughness can be smoothened by this technique.

Different oxidants can be used to react with silicon to form $SiO_2$. The oxidation temperature and time should be chosen according to the chosen oxidant, since the reaction rate depends on the specific species of oxidants used.

An experiment was carried out to demonstrate the invention. The 0.34 μm thick silicon layer of a SOI wafer, which is positioned on top of a 1 μm thick $SiO_2$ layer, was patterned to get the core of a strip waveguide. Photolithography and reactive ion etching were used to pattern the waveguide core. The waveguide core showed sidewall roughness resulting from the patterning process. The waveguide went through an oxidation reaction that involved the following steps: a dry oxidation step for 20 minutes with $O_2$ gas at 1000° C., a wet oxidation step for 43 minutes with $H_2O$ and $O_2$ at 1000° C., and a dry oxidation step for 20 minutes with $O_2$ gas at 1000° C.

Most of the $SiO_2$ was formed during the wet oxidation step, due to its fast reaction, and hence it is a critical step in the experiment. After the reaction the waveguide dimensions were about 0.5 μm in width and <0.3 μm in height. This single mode waveguide exhibited scattering loss of less than 0.8 dB/cm, compared to comparably sized waveguide with no oxidation smoothing, which exhibited over 30 dB/cm.

During the experiment, the waveguide thickness decreased due to the consumption of silicon to form $SiO_2$. The reduction in thickness resulted in the reduction of the effective refractive index of the core, and thus in the reduction of the effective refractive index difference between the core and the cladding. The reduction in the effective refractive index difference between the core and the cladding resulted in additional reduction of the scattering loss since the scattering loss is a strong function of the refractive index difference between the core and the cladding.

While exemplary embodiments of the invention have been illustrated with subjecting the already-fabricated Si/$SiO_2$ waveguide core to the oxidation reaction to reduce the core/cladding interface roughness, it will be appreciated that annealing the already-fabricated Si/$SiO_2$ waveguide core in an gaseous ambient including hydrogen gases at elevated temperatures smoothens the core/cladding interface, and can also reduce the roughness and thus reduce losses. The silicon core material undergoes a diffusive process that tends to minimize the energy of the rough core surface, smoothing the rough core/cladding interface.

While exemplary embodiments of the invention have been illustrated with subjecting the already-fabricated waveguide core to the oxidation reaction to reduce the core/cladding interface roughness, it will be appreciated that subjecting the already-fabricated waveguide core to a wet chemical etch smoothens the core/cladding interface, and can also reduce the roughness and thus reduce losses. Both anisotropic and isotropic etchants can be used. When an anisotropic etchant is used to smooth a single-crystalline core material, some or all of the core surfaces can become crystal planes, resulting in atomically smooth surfaces. Examples of anisotropic etchants for single-crystalline silicon core are KOH (Potassium Hydroxide) and TMAH (Tetra-Methyl-Ammene-Hydroxide). When an isotropic etchant is used, the etching process reduces the roughness on the core surfaces to minimize the energy of rough surfaces.

Although the present invention has been shown and described with respect to several preferred embodiments thereof, various changes, omissions and additions to the form and detail thereof, may be made therein, without departing from the spirit and scope of the invention.

What is claimed is:

1. A method of making a low-loss high index difference waveguide having silicon as its core, comprising:
   providing a planar strip waveguide having core/cladding interface roughness; and
   subjecting said waveguide to one or more reactions so that one of said reactions produces reaction products with different chemical compositions from that of said core and reduce the core/cladding interface root-mean-square (RMS) roughness in order to in turn reduce scattering losses in said waveguide, wherein the effective index difference between said core and cladding is above 0.1, said reaction products having graded refractive index profiles from that of the core to that of the cladding.

2. The method of claim 1, wherein the waveguide core is reduced in size.

3. The method of claim 1, wherein the effective index of the waveguide is reduced.

4. The method of claim 1, wherein said reaction products are removed after the reaction.

5. The method of claim 1, wherein said reaction products are left between the core and the cladding after the reaction.

6. The method of claim 1, wherein said reaction products have refractive indices that change from that of the core to that of the cladding.

7. The method of claim 1, wherein one of said reactions comprises a wet chemical reaction.

8. The method of claim 7, wherein said wet chemical reaction occurs with one or more anistropic etchants having OH⁻ ions in aqueous solution.

9. The method of claim 7, wherein said wet chemical reaction occurs with one or more isotropic etchants.

10. The method of claim 1, wherein one of said reactions comprises a thermal reaction at elevated temperatures above 100° C.

11. The method of claim 1, wherein one of said reactions comprises an oxidation reaction.

12. The method of claim 11, wherein said oxidation reaction comprises reactant species including oxygen in their chemical compositions.

13. The method of claim 11, wherein said oxidation reaction occurs at temperatures above 600° C.

14. The method of claim 11, wherein said reaction products are removed after the reaction.

15. The method of claim 11, wherein said reaction products are left between the core and the cladding after the reaction.

16. The method of claim 11, wherein the cladding includes a region of air or vacuum.

17. The method of claim 11, wherein the cladding includes a region of air or vacuum before said reactions and no region of air or vacuum after said reactions.

18. The method of claim 11, wherein the cladding includes a region of material that includes silicon in its chemical composition.

19. The method of claim 1, wherein one of said reactions comprises annealing in an ambience other than air at elevated temperatures above 100° C.

20. The method of claim 1, wherein said strip waveguide has said core surrounded by said cladding: said cladding comprising one or more materials having different refractive indices than said core.

21. The method of claim 20, wherein the cladding includes a region of silicon dioxide.

22. The method of claim 20, wherein the cladding includes a region of air or vacuum.

23. The method of claim 20, wherein the cladding includes a region of air or vacuum before said reactions and no region of air or vacuum after said reactions.

24. The method of claim 1, wherein the cladding includes a region of material that includes silicon in its chemical composition.

25. A method of making a low-loss high index difference waveguide, comprising:
   providing a planar waveguide containing core/cladding interface roughness; and
   subjecting said waveguide to one or more treatments so that one of said treatments is a reaction that produces reaction products with different chemical compositions from that of the core and reduces the core/cladding interface root-mean-square (RMS) roughness in order to in turn reduce scattering losses in said waveguide, wherein the effective index difference between said core and cladding is above 0.1, said reaction products have graded refractive index profile from that of the core to that of the cladding.

26. The method of claim 25, wherein the difference in the effective refractive indices of the core and the cladding of said high index difference waveguide is greater than or equal to 0.1.

27. The method of claim 25, wherein the single-mode cutoff dimension of said high index difference waveguide is less than 2.5 time the wavelength in the core.

28. The method of claim 25, wherein the waveguide core is reduced in size.

29. The method of claim 25, wherein the effective index of the waveguide is reduced.

30. The method of claim 25, wherein said reaction products are removed after the reaction.

31. The method of claim 25, wherein said reaction products are left between the core and the cladding after the reaction.

32. The method of claim 25, wherein said reaction products have refractive indices that change from that of the core to that of the cladding.

33. The method of claim 25, wherein one of said treatments involves wet chemical reaction.

34. The method of claim 25, wherein one of said treatments involves thermal reaction at elevated temperatures above 100° C.

35. The method of claim 25, wherein one of said treatments involves oxidation reaction.

36. The method of claim 35, wherein said oxidation reaction comprises the reactant species including oxygen in their chemical compositions.

37. The method of claim 35, wherein said oxidation reaction occurs at temperatures above 600° C.

38. The method of claim 25, wherein one of said treatments comprises annealing in an ambience other than air at elevated temperature above 100° C.

39. The method of claim 25, wherein the core includes silicon in its chemical composition.

40. The method of claim 25, wherein the cladding is a region or regions surrounding the core with lower effective refractive index than that of the core.

41. The method of claim 40, wherein the cladding includes a region of silicon dioxide.

42. The method of claim 40, wherein the cladding includes a region of air or vacuum.

43. The method of claim 40, wherein the cladding includes a region of air or vacuum before said treatments and no region of air or vacuum after said treatments.

* * * * *